United States Patent
Keltcher et al.

(10) Patent No.: US 6,782,453 B2
(45) Date of Patent: Aug. 24, 2004

(54) STORING DATA IN MEMORY

(75) Inventors: Paul Keltcher, Sunnyvale, CA (US);
Stephen Richardson, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 318 days.

(21) Appl. No.: 10/072,925

(22) Filed: Feb. 12, 2002

(65) Prior Publication Data

US 2003/0154348 A1 Aug. 14, 2003

(51) Int. Cl.[7] .............................................. G06F 12/00
(52) U.S. Cl. .................... 711/133; 711/144; 711/145
(58) Field of Search ................................ 711/133, 134, 711/135, 141, 143, 144, 145

(56) References Cited

U.S. PATENT DOCUMENTS

| | | | | |
|---|---|---|---|---|
| 5,119,485 A | * | 6/1992 | Ledbetter et al. ........... | 711/146 |
| 5,197,144 A | * | 3/1993 | Edenfield et al. .......... | 711/143 |
| 5,255,384 A | * | 10/1993 | Sachs et al. ................ | 711/207 |
| 5,463,759 A | * | 10/1995 | Ghosh et al. ............... | 711/134 |
| 5,469,555 A | * | 11/1995 | Ghosh et al. ............... | 711/133 |
| 6,148,675 A | * | 11/2000 | Okano ......................... | 73/763 |
| 6,278,645 B1 | * | 8/2001 | Buckelew et al. ..... | 365/230.01 |
| 6,681,297 B2 | * | 1/2004 | Chauvel et al. ............. | 711/130 |

OTHER PUBLICATIONS

Tanenbaum, "Structured Computer Organization", © 1984 Prentice–Hall, Inc., pp. 10–12.*

* cited by examiner

*Primary Examiner*—Donald Sparks
*Assistant Examiner*—Brian R. Peugh

(57) ABSTRACT

In response to determining a requested line of data is not stored within a local memory, the requested line of data is written to the local memory from a remote memory. Additionally, a victim page is selected in the local memory in response to the requested line of data not being in the local memory and it is determined whether one or more lines of the victim page are dirty. Furthermore, the one or more dirty lines are written to the remote memory in response to determining that the one or more lines are dirty and the requested line of data is fetched from the remote memory. Moreover, the requested line of data is stored within the page of data at a location previously occupied by the victim page.

23 Claims, 7 Drawing Sheets

STORING DATA IN MEMORY

FIELD OF THE INVENTION

This invention relates generally to computer memory, and more particularly to a scheme for storing data in the memory.

BACKGROUND OF THE INVENTION

It is generally known that computers have significantly changed since they were first developed. For example, during the early development of the computer, the processor and the memory typically operated at the same speed, more or less. Due to the fact that both the memory and the processor operated at approximately the same speed, the processor did not generally have to wait for the memory to supply it data.

Since this time, the speed of every component (e.g., processor, memory, etc.) of the computer has increased. However, processor speeds have increased relatively faster than memory speeds. This disparity in speed growth has resulted in processors that run significantly faster than the memory. Thus, it is a goal in modem system design, to expediently provide the processor with data for reducing processor waiting time and minimize the wasting of processing cycles. One method of reducing processor latency is to utilize a relatively high speed memory (e.g., static random access memory "SRAM"). However, the cost of a sufficient amount of SRAM to provide data storage for current computer applications (e.g., 64 mega bytes "MB") makes this method prohibitive. A second method of reducing processor latency is to place memory in close proximity to the processor or on the same chip as the processor. However, the physical dimensions of the chip limit the amount of memory that can be placed on or around the chip.

In this regard, current computers generally utilize a comparatively small "cache" (e.g., 256 kilo bytes "KB", 1 MB and the like) of relatively fast memory located on or near the chip with the processor and a comparatively large amount of system or remote memory. The remote memory is a relatively slower and less expensive memory (e.g., dynamic random access memory "DRAM" and the like) located in a remote location (e.g., somewhere on the motherboard, on a daughter board, etc.). Additionally, the cache is typically represented as two or more levels of cache. For example a level 1 ("L1") cache or caches is typically smaller, faster and in closer proximity to the processor than a level 2 ("L2") cache.

The L1 or primary cache is typically the fastest memory available to the processor. It is in fact, built directly into the processor itself and runs at the same speed as the processor in most cases. While fast, the L1 cache is very small, generally from 8 KB to 64 KB. If the processor requests information and can find it in the L1 cache, that is the best case, because the information is there immediately and the system does not have to wait.

The L2 cache is a secondary cache to the L1 cache, and is larger and slower as compared to the L1 cache. In general, the L2 cache is utilized to store data recently accessed by the processor that is not stored in the L1 cache. The size of the L2 cache is typically in the range of 64 KB to 4 MB. Due to the fact that the L1 and the L2 cache are built into or are in relatively close proximity to the processor, the combined memory resources of the L1 and the L2 cache are often referred to as the "local memory".

In general, data flows between the various levels of cache in the following manner. The processor requests a piece of information. The first place the processor looks for the information is in the L1 cache. If the information is found in the L1 cache (called an "L1 hit"), the information may be utilized by the processor with no performance delay. If the information is not found in the L1, the L2 cache is searched. If the information is found in the L2 cache (called an "L2 hit"), the information may be utilized by the processor with relatively little delay. Otherwise, the processor must issue a request to read the information from the remote memory. The remote memory may in turn either have the information available or have to get it from the still slower hard disk or CD-ROM. A caching algorithm is utilized to migrate data required by the processor between the various levels of the cache and also to migrate data between the cache and the remote or "main" memory.

Due to the fact that getting information to the processor has become a limiting factor in computer performance, designing more efficient caching algorithms has become extremely important in improving overall computer performance. Specifically, the hit ratio and the search speed must be maximized to improve the cache performance. The hit ratio is a measure of the likelihood of the cache containing the memory addresses that the processor requires. The search speed is a measure of how quickly it is determined if a hit in the cache has occurred. In this regard, there is a critical tradeoff in cache performance that has led to the creation of a multitude of caching algorithms.

FIG. 4 illustrates a conventional direct mapping caching scheme 400 of one such conventional caching algorithm. The caching scheme 400 illustrated in FIG. 4 depicts the flow of data during a particular data operation. Specifically, the data operation is the replacement of a relatively low priority data with a relatively high priority data. In the caching scheme 400, the processor (not shown) requires a line 405. The processor references a local memory 410 to determine whether the line 405 is present (i.e., a "tag match") or not present (i.e., a "tag mismatch").

In the caching scheme 400, each line in the local memory 410 is associated with an address 415. Included within the address 415 is a "tag" 420 utilized to associate the line in the local memory 410 to a corresponding line in a remote memory 425. The "tag" portion 420 of the address 415 is stored with the cache line, while the remaining portion of the address can be derived implicitly by the line's physical location within the cache. In the example shown, it has been determined that the line 405 is not present in the local memory 410. Thus, the processor must issue a request to retrieve the line 405 from the remote memory 425.

Utilizing the caching scheme 400, a victim line 430 is located within the local memory 410 and replaced with the line 405. In a direct mapped scheme such as that described here, the selection of a victim line is precisely determined by the non-tag portion of its address. In a more general scheme, however, victim lines would be selected based on how likely it is that the line will be utilized by the processor. Typically, the longer the time interval since the line has been utilized, the more likely the line will be chosen as the victim. Prior to replacing the line 430 with the line 405, it is determined if the line 430 contains new information. In this regard, a "dirty" bit 435 is utilized to indicate that the line has been altered since it was retrieved from remote memory 425. Thus, if the dirty bit 435 of the line 430 is turned on, the line 430 must be written back to the corresponding location in the remote memory 425 in order to avoid losing the new information stored to the line 430.

While the conventional caching scheme 400 has the advantage of being relatively simple and having a relatively fast search speed, the caching scheme 400 suffers a number of disadvantages. For example, read and write requests are processed individually rather than as a batch or "burst" process. A second disadvantage of the caching scheme 400 is the overhead caused by the address tag 420. For example, in a 64-bit processor, a 4 MB direct mapped cache of 32 byte lines may have an address tag of 42 bits for every 32 byte line. This equates to 16.4 percent memory usage for address tags.

In an effort to improve upon conventional direct mapping scheme for relatively large L2 memories, a demand paging caching scheme was developed. In the demand paging scheme, a plurality of lines are moved into the cache rather than individual lines in the direct mapping scheme. The plurality of lines are collectively described by those skilled in the art as a "page" of data. In this manner, an address tag may reference a page and thus, each line has a reduced memory overhead.

FIGS. 5A to 5D collectively illustrate a conventional demand paging caching scheme 500. Each page has a unique virtual page number by which CPU 501 refers to that page. In addition, each memory page has a unique physical page number in remote memory. Furthermore, if the page happens to be cached in local memory, it will have a local physical page number. Page table 510 maintains complete virtual-to-physical mappings for all memory pages. In addition, a translation lookaside buffer ("TLB") 505 caches some, but not necessarily all, virtual-to-local-physical-page-number mappings. In FIG. 5A, a processor 501 requires a line ffffc010 within a virtual page ffffc. In an attempt to find the virtual page ffffc, the processor 501 queries a translation lookaside buffer ("TLB") 505. The TLB 505 maintains an associative table of virtual page addresses and their corresponding local physical page addresses for a local memory 515 (shown in FIG. 5B). In response to not finding the virtual page ffffc within the local memory 515, a page fault is generated.

In response to the page fault, a victim page mapping is selected from the TLB 505 and a victim local page is identified by consulting page table 510. The page table 510 maintains an associative table of virtual page addresses and their corresponding local and remote physical addresses. As depicted in FIG. 5A, the victim page mapping for the TLB 505 is the 0703c/0002 mapping, and page table 510 has been used to select a victim page with local physical address 10040.

As shown in FIG. 5B, in response to a dirty bit 525 for the page 10040 being turned "on", the information contained in the page 10040 of the local memory 515 is re-written to its corresponding remote memory 520 page location. The dirty bit 525, in a manner similar to the dirty bit described in FIG. 4, is utilized to identify that information within the page 10040 has been modified. However, regardless of the number of modified lines within the page, the entire page 10040 is re-written.

As shown in FIG. 5C, the dirty bit 525 is turned "off" and the contents of the remote physical page 11008 (also known as the virtual page ffffc) are migrated into the local memory 515.

As shown in FIG. 5D, the TLB 505 and the page table 510 are updated as required.

While demand paging scheme improves the ability to batch process read and write processes and decreases the memory overhead as compared to direct mapping caching scheme, demand paging scheme has a number of disadvantages. For example, one particular disadvantage in demand paging is that if one line in a page has a dirty bit turned on, the entire page is written back to memory. A second disadvantage is that when a single line is required by the processor, an entire page is moved to cache, regardless of how many other lines from that page are required by the processor.

SUMMARY OF THE INVENTION

In one respect, the invention pertains to a method of writing back a dirty page from a local memory to a remote memory. In this method, a plurality of memory pages are stored in the local memory. Each page contains a plurality of memory lines. Further, it is determined in this method whether one or more lines of a page of the plurality of pages in the local memory are dirty. Additionally, in this method, only the one or more dirty lines of the dirty page are written back to the remote memory.

In another respect, the invention relates to a method of writing data to a local memory from a remote memory. In this method, a request for a line of data associated with a page of data is received and it is determined whether the page of data is in the local memory. A victim page is selected in the local memory in response to the page of data not being in the local memory and it is determined whether one or more lines of the victim page are dirty. Only the one or more dirty lines are written to the remote memory in response to determining that one or more lines are dirty. The requested line of data is fetched from the remote memory and the requested line of data is stored in the local memory within the page of data at a location previously occupied by the victim page.

In yet another respect, the invention pertains to a computer readable medium on which is embedded computer software, the software comprising executable code for performing a method of writing back a dirty page from a local memory to a remote memory. In this method, a plurality of memory pages are stored in the local memory. Each page contains a plurality of memory lines. Further, it is determined in this method whether one or more lines of a page of the plurality of pages in the local memory are dirty. Additionally, in this method, only the one or more dirty lines of the dirty page are written back to the remote memory.

In yet another respect, the invention relates to a computer readable medium on which is embedded computer software, the software comprising executable code for performing a method of writing data to a local memory from a remote memory. In this method, a request for a line of data associated with a page of data is received and it is determined whether the page of data is in the local memory. A victim page is selected in the local memory in response to the page of data not being in the local memory and it is determined whether one or more lines of the victim page are dirty. Only the one or more dirty lines are written to the remote memory in response to determining that one or more lines are dirty. The requested line of data is fetched from the remote memory and the requested line of data is stored in the local memory within the page of data at a location previously occupied by the victim page.

In yet another respect, the invention pertains to an apparatus for storing data in a memory. The apparatus includes a processor and a remote memory. The apparatus further includes a local memory configured to store a page of data. The page of data includes a plurality of lines of data. Each line of data has a respective valid bit and dirty bit. The respective valid bit is utilized to indicate data stored by the corresponding line of data has been fetched from the remote memory. The respective dirty bit is utilized to indicate data stored by the corresponding line of data has been modified by the processor. The apparatus further includes a bus configured to interconnect the processor, the remote memory and the local memory.

In yet another respect, the invention relates to a method of writing data to a local memory from a remote memory. In this method, a request for a line of data associated with a page of data is received and it is determined whether the page of data is in the local memory. Further, in response to the page of data being in the local memory, it is determined whether the requested line of data is in the local memory. Additionally, in response to the requested line of data not being in the local memory, only the requested line of data is fetched from the remote memory and stored within the page of data. Moreover, a valid bit is set for the requested line of data stored within the page of data.

In yet another respect, the invention pertains to a method for storing data in memory. In this method, a request for a line of data associated with a page of data is received and it is determined whether the page of data is in a local memory. A victim page is selected in the local memory in response to the page of data not being in the local memory and it is determined whether one or more lines of the victim page are dirty. In response to determining that one or more lines of the victim page are dirty only the one or more dirty lines of the victim page are written to a remote memory. Further, in response to selecting the victim page, it is determined whether one or more lines of the victim page are valid. In response to determining one or more lines of the victim page are valid, the one or more valid bits associated with the victim page are cleared. Additionally, the requested line of data is fetched from the remote memory and stored within the page of data at a location previously occupied by the victim page. Moreover, a valid bit associated with the requested line is set and a page table and a translation lookaside buffer are updated with data associated with storing the requested line of data within the page of data at a location previously occupied by the victim page.

In yet another respect, the invention relates to an apparatus for writing back a dirty page from a local memory to a remote memory. The apparatus includes a means for storing a plurality of memory pages in the local memory. Each of the plurality of memory pages contains a plurality of memory lines. The apparatus further includes a means for determining whether one or more lines of a page of the plurality of pages in the local memory are dirty; and a means for writing back only the one or more dirty lines of the page to the remote memory.

In yet another respect, the invention pertains to an apparatus for writing data to a local memory from a remote memory. The apparatus includes a means for receiving a request for a line of data. The line of data being associated with a page of data. The apparatus further includes a means for determining whether the page of data is in the local memory and a means for selecting a victim page in the local memory in response to the page of data not being in the local memory. Additionally, the apparatus includes a means for determining whether one or more lines of the victim page are dirty and a means for writing only the one or more dirty lines of the victim page to the remote memory in response to determining that one or more lines of the victim page are dirty. Furthermore, the apparatus includes a means for fetching the requested line of data from the remote memory and a means for storing the requested line of data in the local memory within a location previously occupied by the victim page.

In yet another respect, the invention relates to an apparatus for writing data to a local memory from a remote memory. The apparatus includes a means for receiving a request for a line of data. The line of data is associated with a page of data. The apparatus further includes a means for determining whether the page of data is in the local memory and a means for determining whether the requested line of data is in the local memory in response to the page of data being in the local memory. Additionally, the apparatus includes a means for fetching only the requested line of data from the remote memory in response to the requested line of data not being in the local memory. Moreover, the apparatus includes a means for storing only the requested line of data within the page of data and a means for setting a valid bit for the requested line of data stored within the page of data.

In yet another respect, the invention pertains to an apparatus for storing data to memory. The apparatus includes a means for receiving a request for a line of data. The line of data is associated with a page of data. The apparatus further includes a means for determining whether the page of data is in a local memory and a means for selecting a victim page in the local memory in response to the page of data not being in the local memory. Additionally, the apparatus includes a means for determining whether one or more lines of the victim page are dirty, a means for writing only the one or more dirty lines of the victim page to a remote memory in response to determining that one or more lines of the victim page are dirty, and a means for determining whether one or more lines of the victim page are valid in response to selecting the victim page. Furthermore, the apparatus includes a means for clearing the one or more valid bits associated with the victim page in response to determining one or more lines of the victim page are valid, a means for fetching the requested line of data from the remote memory and a means for storing the requested line of data within the page of data at a location previously occupied by the victim page. Moreover, the apparatus includes a means for setting a valid bit associated with the requested line, a means for updating a page table with data associated with storing the requested line of data within the page of data at a location previously occupied by the victim page and a means for updating a translation lookaside buffer with data associated with storing the requested line of data within the page of data at a location previously occupied by the victim page.

BRIEF DESCRIPTION OF THE DRAWINGS

The embodiments of the invention are illustrated by way of example and not limitation in the accompanying figures in which like numeral references refer to like elements, and wherein.

DETAILED DESCRIPTION OF A PREFERRED EMBODIMENT

For simplicity and illustrative purposes, the principles of the invention are described by referring mainly to an exemplary embodiment thereof, particularly with references to a caching scheme for a multi-processor system having a plurality of memory caches. However, one of ordinary skill in the art would readily recognize that the same principles are equally applicable to, and may be implemented in, a system capable of migrating data across a plurality of memory systems or subsystems, and that any such variations are within the scope of the invention. While in the following description numerous specific details are set forth in order to provide a thorough understanding of an embodiment of the invention, in other instances, well known methods and structures have not been described in detail so as not to obscure the invention.

Figure 1:
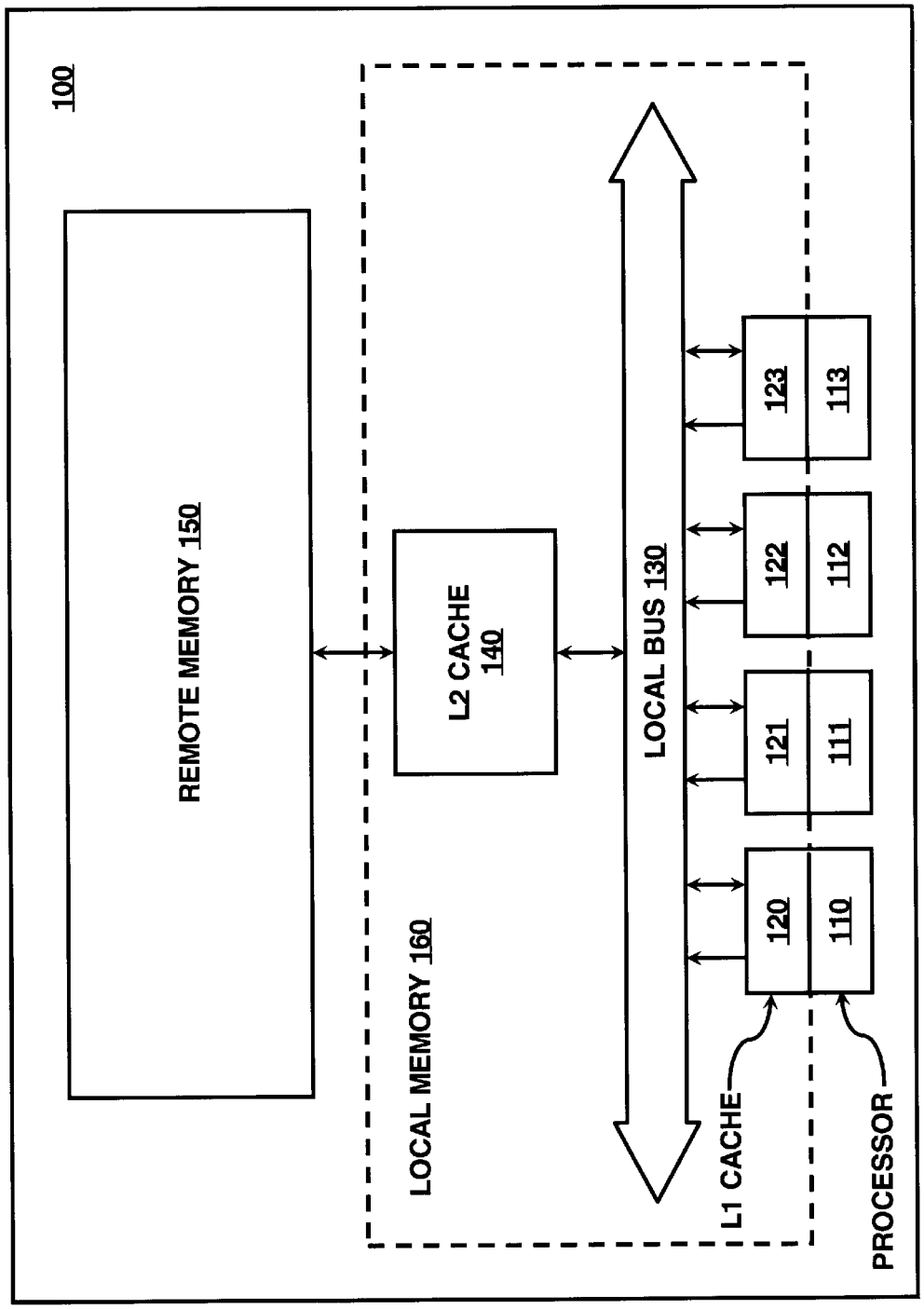
FIG. 1 illustrates a block diagram of a system according to an embodiment of the invention.

FIG. 1 illustrates a block diagram of a system 100 according to an embodiment of the invention. As shown in FIG. 1, the system 100 includes a plurality of processors 110–113, each having a respective L1 cache 120–123. The processors 110–113 also utilize a local bus 130 to access an L2 cache 140. The system 100 further includes a remote memory 150.

In one embodiment of the system 100, a local memory 160 may be defined as an L1 cache associated with one of the processors 110–113 and a subset of the L2 cache 140. For example, the local memory 160 for the processor 110 may be defined as the L1 cache 120 plus a subset of the L2 cache 140. In this manner, each processor 110–113 may maintain the integrity of its own data.

Figure 2A:
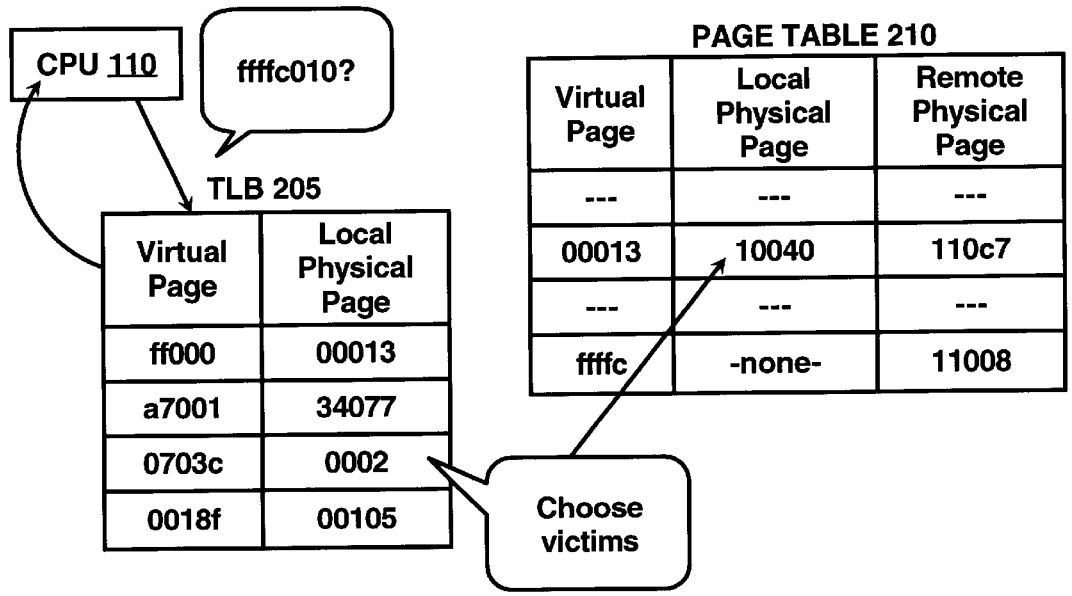
FIGS. 2A to 2D collectively illustrate a caching scheme according to an embodiment of the invention.
Figure 2B:
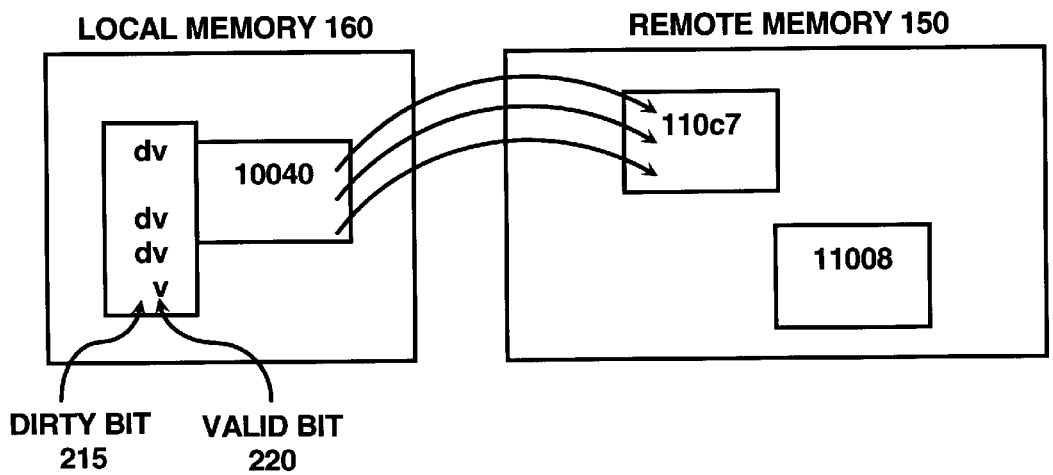

FIGS. 2A to 2D collectively illustrate a caching scheme 200 according to an embodiment of the invention. As shown in FIG. 2A, the processor 110 requires a line ffffc010 within a virtual page ffffc. In an attempt to find the virtual page ffffc, the processor 110 queries a translation lookaside buffer ("TLB") 205. The TLB 205 may maintain an associative table of virtual page addresses and their corresponding local physical page addresses for the local memory 160 (as shown in FIG. 2B). In response to not finding the virtual page ffffc within the local memory 160, a page fault may be generated.

In response to the page fault, a victim page mapping is selected from the TLB 205 and a virtual local page is identified by consulting page table 210. The page table 210 may maintain an associative table of virtual page addresses and their corresponding local and remote physical addresses. The victim page may be selected by any known or future replacement policies (e.g., first-in-first-out "FIFO", least recently used "LRU", etc.). As depicted in FIG. 2A, the victim page mapping for the TLB 205 is the 0703c/0002 mapping, and page table 210 has been used to select a victim page with local physical address 10040.

As shown in FIG. 2B, the information contained in the page 10040 of the local memory 160 may be re-written to its corresponding remote memory 150 page location. However, according to one form of the caching scheme 200, only those lines that are both valid and have been modified need be re-written to the remote memory 150. In this respect, each line within the page may have a dirty bit 215 and a "valid" bit 220. The valid bit 220 may be utilized to identify that a line represents information that has been migrated from the remote memory 150. The dirty bit 215, in a manner similar to known dirty bits, may be utilized to further identify that information associated with a valid bit 220 has been modified. Thus, the caching scheme 200 may save time and system resources by performing fewer write processes. Additionally, the caching scheme 200 may utilize batch process writes.

Figures 2C, 2D:
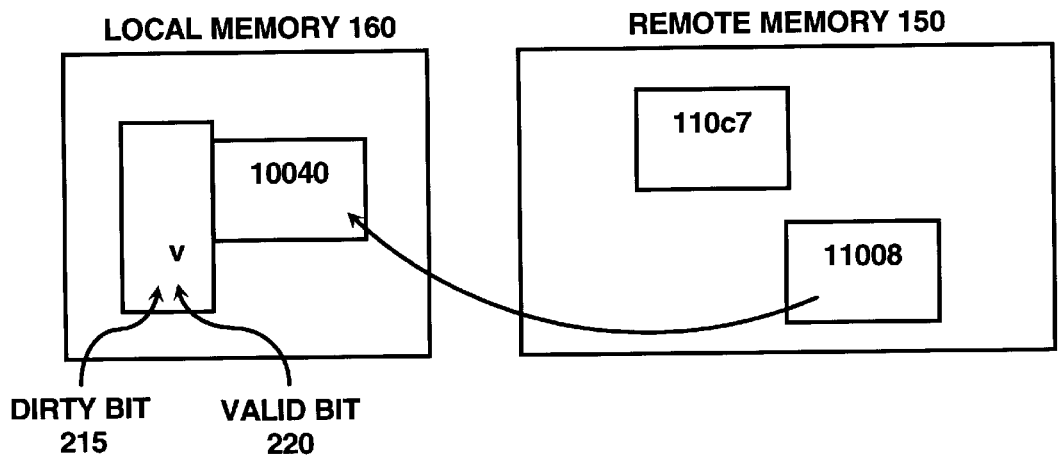

As shown in FIG. 2C, the line required by the processor 110 may be migrated into the local memory 160 and the valid bit 220 for that line may be set. In various other forms, the caching scheme 200 may migrate a plurality of lines rather than the one or more lines required by the processor 110. For example, various "prefetching" strategies may be utilized by the caching scheme 200.

As shown in FIG. 2D, the TLB 205 and the page table 210 may be updated as required.

Figure 3:
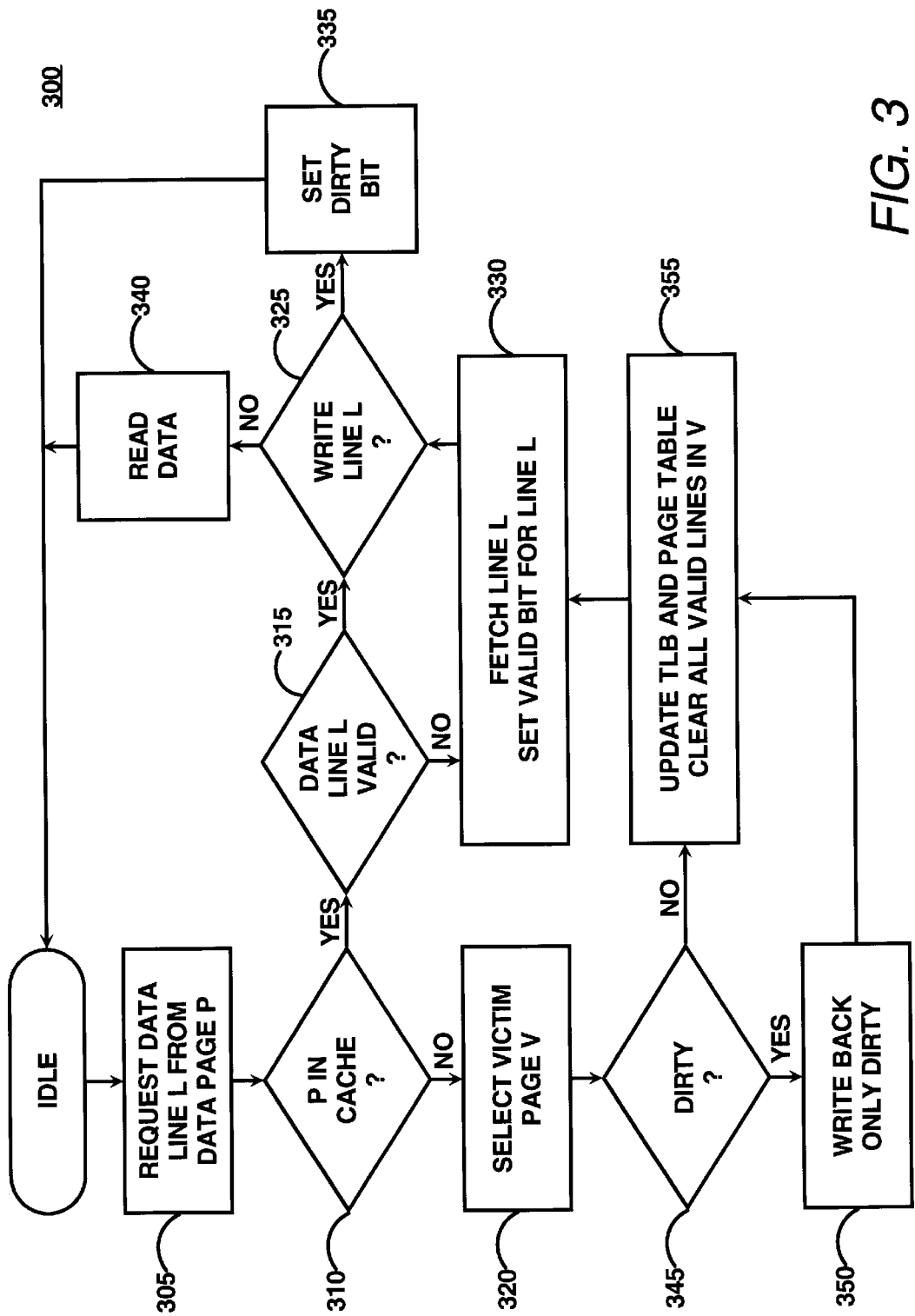
FIG. 3 is a flow diagram of a method, according to an embodiment of the invention.
Figure 4:
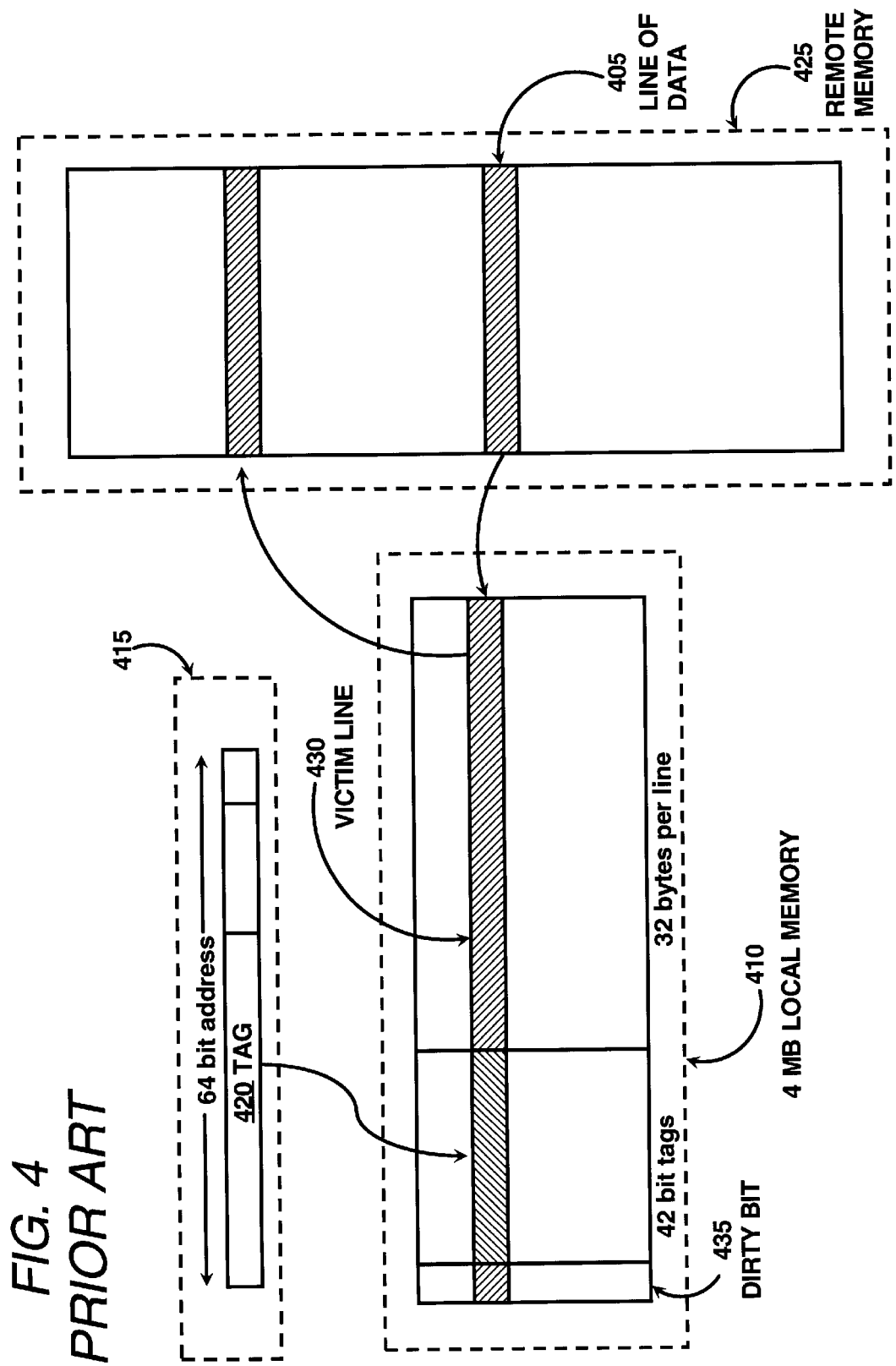
FIG. 4 illustrates a conventional direct mapping caching scheme.
Figure 5A:
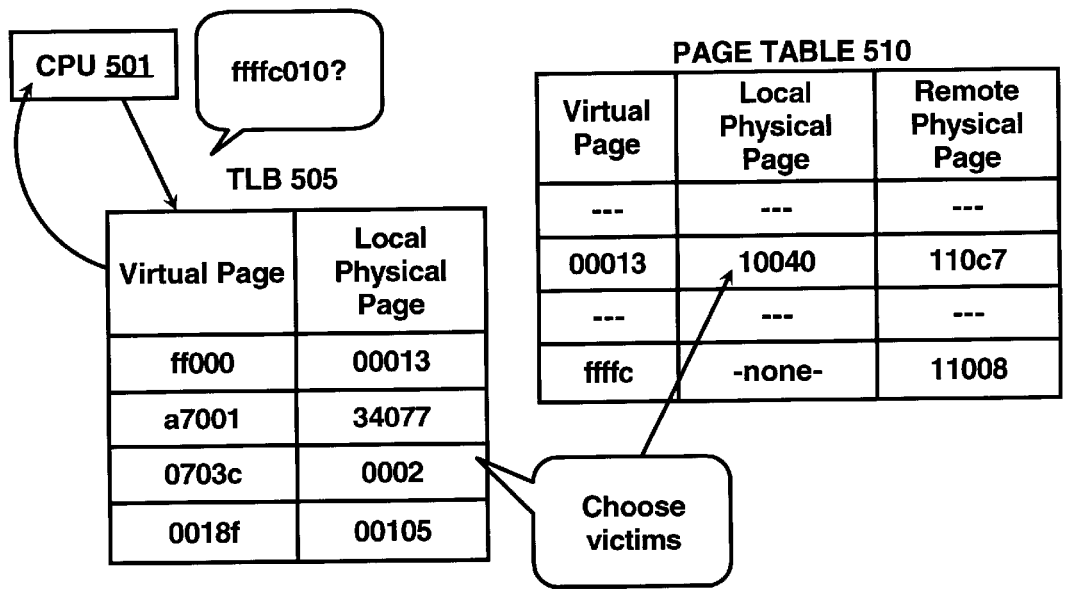
FIGS. 5A to 5D collectively illustrate a conventional demand paging caching scheme.
Figure 5B:
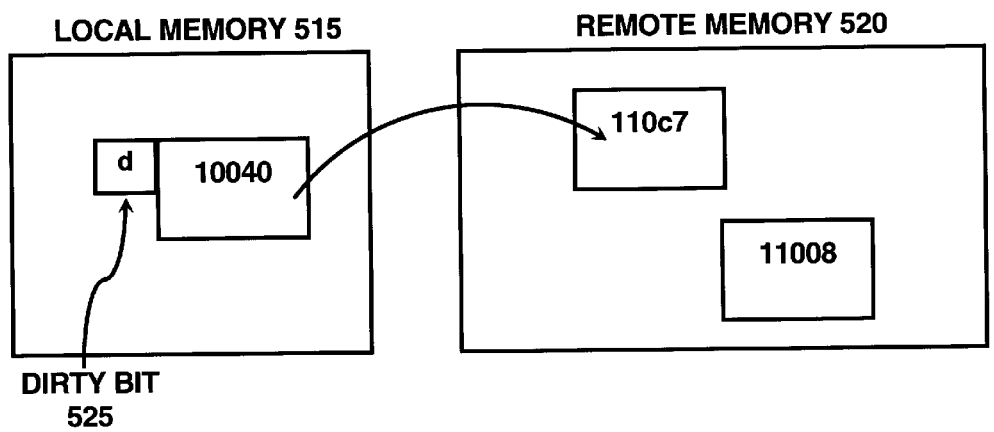
Figure 5C:
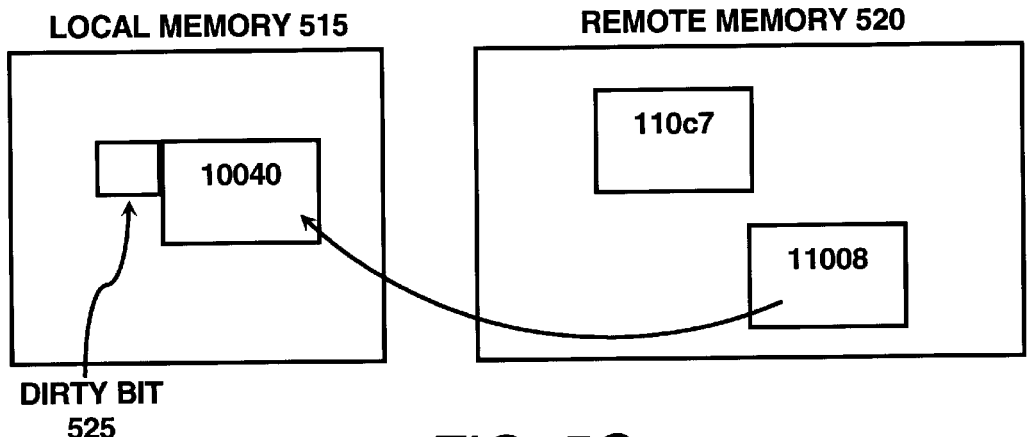
Figure 5D:
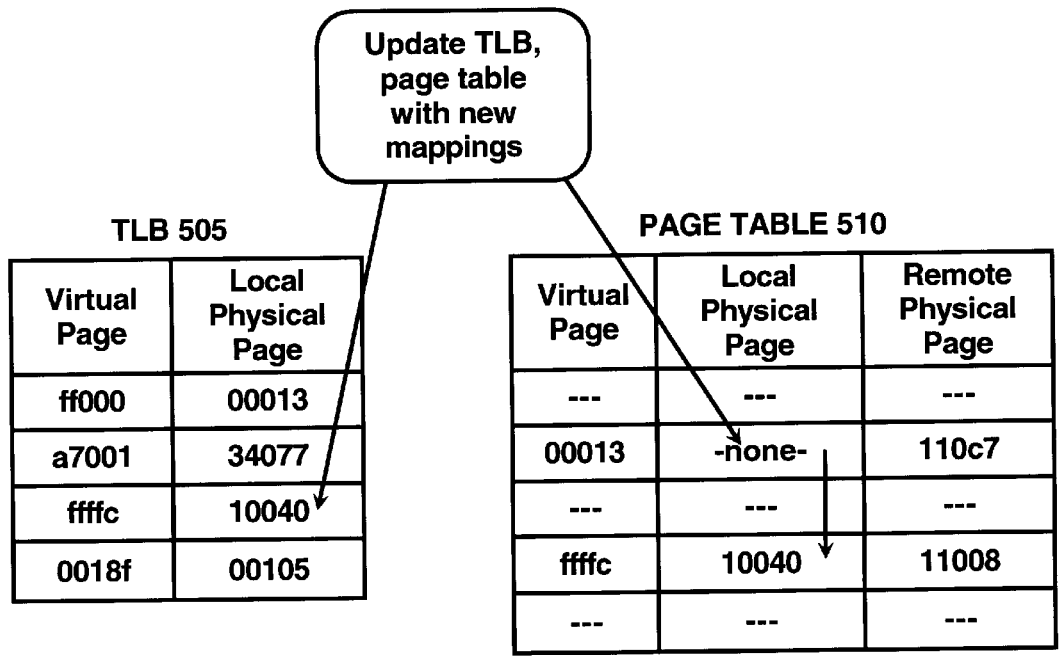

FIG. 3 is a flow diagram of a method 300, according to an embodiment of the invention. The following description of FIG. 3 will be made with particular reference to the system described in FIG. 1 and the caching scheme described in FIGS. 2A to 2D. In general, the method 300 may improve the performance of cache memory. Specifically, the method 300 may decrease latency time associated with read from and write to memory events. Additionally, this improvement may be present in a variety of workloads utilizing a range of processing systems. As shown in FIG. 3, the method 300 may be initiated at step 305 in response to a processor requesting a line "L" of data (i.e., a data read or write request) from a page "P". In one embodiment of the method 300, the processor may be similar to the processor 110, the line "L" may be similar to the line ffffc010 (i.e., the data line ffffc010) and the page "P" may be similar to the virtual page ffffc as shown in FIG. 2A. Following the step 305, the method 300 may proceed to step 310.

At step 310, a cache is referenced to determine whether the page "P" is stored locally. In one embodiment of the method 300, the cache may be similar to the local memory 160 and may further be referenced by accessing the TLB 205 as shown in FIG. 2A. If it is determined that the page "P" is stored in the cache, the method 300 may proceed to step 315. If it is determined that the page "P" is not stored in the cache, the method 300 may proceed to step 320.

At step 315, it is determined whether the line "L" is valid. For example, in a manner similar to the valid bit 220 described in FIG. 2, if a valid bit associated with the line "L" is set "on", the line "L" is determined to be valid and thus, the data from the remote memory has previously been fetched and stored to line "L". If the line "L" is determined to be valid, the method 300 may proceed to step 325. Conversely, if the "L" is determined to be invalid, the method 300 may proceed to step 330.

At step 325, it is determined whether a read or a write function is to be performed on the line "L". If a write function is to be performed on the line "L", the method 300 proceeds to step 335. Alternatively, the method 300 proceeds to step 340 if a read function is to be performed on the line "L".

At step 335, data is written to the line "L" by the processor and the dirty bit is set "on". Following the step 335, the method 300 returns to the idle step.

At step 340, in response to it being determined at step 325 that a read function it to be performed, the processor reads the data stored to the line "L". Following the step 315, the method 300 returns to the idle step.

At step 330, data corresponding to the line "L" is fetched from the remote memory and stored to the page "P" in local memory. Additionally, the valid bit associated with the line "L" is set "on". Furthermore, in various other embodiments, known or future prefetching algorithms may be utilized to select and store (and set valid bits for) one or more other lines to the page "P" in addition to the line "L". Following the step 330, the method 300 proceeds to the step 325.

At step 320, in response to it being determined at step 310 that the page "P" is not stored locally one or more victim page(s) and page table entry(s) may be chosen as required.

In one embodiment, a victim page "V" and a page table entry are chosen to store the page "P". In various other embodiments, known or future replacement policies may be utilized to select a plurality of victim pages and page table entries by accessing the TLB 205 and/or the page table 210. Additionally, if the cache includes "free" (e.g., unassigned) memory space, the free space may be utilized to store the victim page(s). Following the step 320, the method 300 proceeds to step 345.

At step 345, the local memory may be referenced to determine whether any lines have been modified by a processor (e.g., a dirty bit associated with at least one line is set, or the like) within the selected page(s). In one embodiment, if it is determined that the victim page "V" is dirty (e.g., one or more lines have been modified), the method 300 proceeds to step 350. Alternatively in this embodiment, if it is determined that the victim page "V" is not dirty, the method 300 proceeds to step 355. In various other embodiments, a dirty status for each of the plurality of selected victim pages may be determined and processed in a batch mode or individually in a manner similar to the victim page "V".

At step 350, any modified lines within the victim page "V" may be written back to the remote memory. Following the step 350, the method 300 proceeds to step 355.

At step 355, in one embodiment, prior to fetching data to be stored in the victim page "V", one or more tables may be updated as required. For example, the TLB 205 and/or the page table 210 may be modified to reflect the movement of the line to the local memory 160. However, the one or more tables may be updated concurrently or after fetching the data and thus the step 355 need not be performed in the order depicted, but rather, may be performed before during or after the step 330. Following the step 355, the method 300 proceeds to the step 330.

The method 300 may exist in a variety of forms both active and inactive. For example, they may exist as software program(s) comprised of program instructions in source code, object code, executable code or other formats. Any of the above may be embodied on a computer readable medium, which include storage devices and signals, in compressed or uncompressed form. Exemplary computer readable storage devices include conventional computer system RAM (random access memory), ROM (read only memory), EPROM (erasable, programmable ROM), EEPROM (electrically erasable, programmable ROM), flash memory, and magnetic or optical disks or tapes. Exemplary computer readable signals, whether modulated using a carrier or not, are signals that a computer system hosting or running the computer program may be configured to access, including signals downloaded through the Internet or other networks. Concrete examples of the foregoing include distribution of the program(s) on a CD ROM or via Internet download. In a sense, the Internet itself, as an abstract entity, is a computer readable medium. The same is true of computer networks in general.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims—and their equivalents—in which all terms are meant in their broadest reasonable sense unless otherwise indicated.

What is claimed is:

1. A method of writing back a dirty page from a local memory to a remote memory, the method comprising the steps of:

storing a plurality of memory pages in the local memory, each page containing a plurality of memory lines;

selecting a page in the local memory for replacement;

determining whether one or more lines of the selected page are dirty;

writing back only the one or more dirty lines of the page to the remote memory;

determining whether one or more lines of the selected page are valid in response to selecting the page; and clearing one or more valid bits associated with one or more lines of the selected page in response to determining the one or more lines of the selected page are valid.

2. The method according to claim 1, further comprising the step of:

updating a page table with data associated with writing back the dirty page.

3. The method according to claim 1, further comprising the step of:

updating a translation lookaside buffer with data associated with writing back the dirty page from the local memory to the remote memory.

4. A method of writing data to a local memory from a remote memory, the method comprising the steps of:

receiving a request for a line of data, the line of data being associated with a page of data;

determining whether the page of data is in the local memory;

selecting a victim page in the local memory in response to the page of data not being in the local memory;

determining whether one or more lines of the victim page are dirty;

writing only the one or more dirty lines of the victim page to the remote memory in response to determining that one or more lines of the victim page are dirty;

fetching the requested line of data from the remote memory;

storing the requested line of data in the local memory within a location previously occupied by the victim page;

determining whether one or more lines of the victim page are valid in response to selecting the victim page; and clearing the one or more valid bits associated with one or more lines of the victim page in response to determining the one or more lines of the victim page are valid.

5. The method according to claim 4, wherein the step of storing the requested line of data further comprises the step of:

setting a valid bit associated with the requested line.

6. The method according to claim 4, wherein the step of storing the requested line of data further comprises the step of:

writing at least one prefetch line of data, in addition to the requested line of data, to the location previously occupied by the victim page, the prefetch line of data being identified by a prefetching strategy.

7. The method according to claim 4, further comprising the step of:

updating a page table with data associated with the requested line of data stored in the local memory.

8. The method according to claim 4, further comprising the step of:
   updating a translation lookaside buffer with data associated with the requested line of data stored in the local memory.

9. A computer readable medium on which is embedded computer software, the software comprising executable code for performing a method of writing back a dirty page from a local memory to a remote memory, the method comprising the steps of:
   storing a plurality of memory pages in the local memory, each page containing a plurality of memory lines;
   selecting a page in the local memory for replacement;
   determining whether one or more lines of the selected page are dirty;
   writing back only the one or more dirty lines of the page to the remote memory;
   determining whether one or more lines of the selected page are valid in response to selecting the page; and
   clearing one or more valid bits associated with one or more lines of the selected page in response to determining the one or more lines of the selected page are valid.

10. The computer readable medium according to claim 9, further comprising the step of:
    updating a page table with data associated with writing back the dirty page.

11. The computer readable medium according to claim 9, further comprising the step of:
    updating a translation lookaside buffer with data associated with writing back the dirty page from the local memory to the remote memory.

12. A computer readable medium on which is embedded computer software, the software comprising executable code for performing a method of writing data to a local memory from a remote memory, the method comprising the steps of:
    receiving a request for a line of data, the line of data being associated with a page of data;
    determining whether the page of data is in the local memory;
    selecting a victim page in the local memory in response to the page of data not being in the local memory;
    determining whether one or more lines of the victim page are dirty;
    writing only the one or more dirty lines of the victim page to the remote memory in response to determining that one or more lines of the victim page are dirty;
    fetching the requested line of data from the remote memory;
    storing the requested line of data in the local memory within a location previously occupied by the victim page;
    determining whether one or more lines of the victim page are valid in response to selecting the victim page; and
    clearing the one or more valid bits associated with one or more lines of the victim page in response to determining the one or more lines of the victim page are valid.

13. The computer readable medium according to claim 12, wherein the step of storing the requested line of data further comprises the step of:
    setting a valid bit associated with the requested line.

14. The computer readable medium according to claim 12, wherein the step of storing the requested line of data further comprises the step of:
    writing at least one prefetch line of data, in addition to the requested line of data, to the location previously occupied by the victim page, the prefetch line of data being identified by a prefetching strategy.

15. The computer readable medium according to claim 12, further comprising the step of:
    updating a page table with data associated with the requested line of data stored in the local memory.

16. The computer readable medium according to claim 12, further comprising the step of:
    updating a translation lookaside buffer with data associated with the requested line of data stored in the local memory.

17. An apparatus comprising:
    a processor;
    a remote memory;
    a local memory configured to store a page of data comprising a plurality of lines of data, each line of data having a respective valid bit and dirty bit, wherein the respective valid bit is utilized to indicate data stored by the corresponding line of data has been fetched from the remote memory and wherein the respective dirty bit is utilized to indicate data stored in the corresponding line of data has been modified by the processor, wherein only dirty lines of data of a selected victim page in the local memory are written to the remote memory and valid bits associated with one or more lines of the victim page are cleared in response to determining the one or more lines of the victim page are valid; and
    a bus configured to interconnect the processor, the remote memory and the local memory.

18. A method of writing data to a local memory from a remote memory, the method comprising the steps of:
    receiving a request for a line of data, the line of data being associated with a page of data;
    determining whether the page of data is in the local memory;
    determining whether the requested line of data is in the local memory is valid in response to the page of data being in the local memory;
    fetching only the requested line of data from the remote memory in response to the requested line of data not being;
    storing only the requested line of data within the page of data;
    setting a valid bit for the requested line of data stored within the page of data;
    selecting a victim page in the local memory in response to the page of data not being in the local memory;
    determining whether one or more lines of the victim page are dirty;
    writing only the one or more dirty lines of the victim page to the remote memory in response to determining that one or more lines of the victim page are dirty;
    storing only the requested line of data at a location previously occupied by the victim
    determining whether one or more lines of the victim page are valid in response to selecting the victim page; and
    clearing one or more valid bits associated with one or more lines of the victim page in response to determining the one or more lines of the selected page are valid.

19. A method comprising the steps of:
    receiving a request for a line of data, the line of data being associated with a page of data;

determining whether the page of data is in a local memory;

selecting a victim page in the local memory in response to the page of data not being in the local memory;

determining whether one or more lines of the victim page are dirty;

writing only the one or more dirty lines of the victim page to a remote memory in response to determining that one or more lines of the victim page are dirty;

determining whether one or more lines of the victim page are valid in response to selecting the victim page;

clearing the one or more valid bits associated with the victim page in response to determining one or more lines of the victim page are valid;

fetching the requested line of data from the remote memory;

storing the requested line of data within the page of data at a location previously occupied by the victim page;

setting a valid bit associated with the requested line;

updating a page table with data associated with storing the requested line of data within the page of data at a location previously occupied by the victim page; and updating a translation lookaside buffer with data associated with storing the requested line of data within the page of data at a location previously occupied by the victim page.

20. An apparatus for writing back a dirty page from a local memory to a remote memory, the apparatus comprising:

a means for storing a plurality of memory pages in the local memory, each page containing a plurality of memory lines;

a means for selecting a page in the local memory for replacement;

a means for determining whether one or more lines of the selected page are dirty;

a means for writing back only the one or more dirty lines of the selected page to the remote memory;

a means for determining whether one or more lines of the selected page are valid in response to selecting the page; and a means for clearing one or more valid bits associated with one or more lines of the selected page in response to determining the one or more lines of the selected page are valid.

21. An apparatus for writing data to a local memory from a remote memory, the apparatus comprising:

a means for receiving a request for a line of data, the line of data being associated with a page of data;

a means for determining whether the page of data is in the local memory;

a means for selecting a victim page in the local memory in response to the page of data not being in the local memory;

a means for determining whether one or more lines of the victim page are dirty; a means for writing only the one or more dirty lines of the victim page to the remote memory in response to determining that one or more lines of the victim page are dirty; a means for fetching the requested line of data from the remote memory;

a means for storing the requested line of data in the local memory within a location previously occupied by the victim page;

a means for determining whether one or more lines of the victim page are valid in response to selecting the victim page; and a means for clearing one or more valid bits associated with one or more lines of the victim page in response to determining the one or more lines of the selected page are valid.

22. An apparatus for writing data to a local memory from a remote memory, the apparatus comprising:

a means for receiving a request for a line of data, the line of data being associated with a page of data;

a means for determining whether the page of data is in the local memory;

a means for determining whether the requested line of data is valid in response to the page of data being in the local memory;

a means for fetching only the requested line of data from the remote memory in response to the requested line of data not being valid;

a means for storing only the requested line of data within the page of data; and a means for setting a valid bit for the requested line of data stored within the page of data.

23. An apparatus comprising:

a means for receiving a request for a line of data, the line of data being associated with a page of data;

a means for determining whether the page of data is in a local memory;

a means for selecting a victim page in the local memory in response to the page of data not being in the local memory;

a means for determining whether one or more lines of the victim page are dirty; a means for writing only the one or more dirty lines of the victim page to a remote memory in response to determining that one or more lines of the victim page are dirty; a means for determining whether one or more lines of the victim page are valid in response to selecting the victim page;

a means for clearing the one or more valid bits associated with the victim page in response to determining one or more lines of the victim page are valid;

a means for fetching the requested line of data from the remote memory;

a means for storing the requested line of data within the page of data at a location previously occupied by the victim page;

a means for setting a valid bit associated with the requested line;

a means for updating a page table with data associated with storing the requested line of data within the page of data at a location previously occupied by the victim page; and a means for updating a translation lookaside buffer with data associated with storing the requested line of data within the page of data at a location previously occupied by the victim page.

* * * * *